(12) United States Patent
Ford et al.

(10) Patent No.: US 7,880,913 B2
(45) Date of Patent: Feb. 1, 2011

(54) METHODS AND SYSTEMS FOR SEGMENTING LOGICAL PAGES INTO WORK UNITS FOR PROCESSING ON MULTIPLE COMPUTE SYSTEMS

(75) Inventors: Arthur K. Ford, Longmont, CO (US); Nenad Rijavec, Longmont, CO (US)

(73) Assignee: InfoPrint Solutions Company, LLC, Boulder, CO (US)

( * ) Notice: Subject to any disclaimer, the term of this patent is extended or adjusted under 35 U.S.C. 154(b) by 1154 days.

(21) Appl. No.: 11/301,506

(22) Filed: Dec. 13, 2005

(65) Prior Publication Data

US 2007/0133028 A1 Jun. 14, 2007

(51) Int. Cl.
G06F 3/12 (2006.01)

(52) U.S. Cl. .................. 358/1.15; 358/1.1; 358/1.13

(58) Field of Classification Search ....... 358/1.11–1.18; 707/101
See application file for complete search history.

(56) References Cited

U.S. PATENT DOCUMENTS

| | | | | |
|---|---|---|---|---|
| 5,287,194 A * | 2/1994 | Lobiondo | .................... | 358/296 |
| 5,828,817 A * | 10/1998 | Landau | ....................... | 358/1.13 |
| 5,978,560 A * | 11/1999 | Tan et al. | .................... | 358/1.15 |
| 5,978,563 A * | 11/1999 | Kawamoto et al. | .......... | 358/1.17 |
| 6,188,490 B1 * | 2/2001 | Miyake | ....................... | 358/1.18 |
| 6,237,021 B1 | 5/2001 | Drummond | | |
| 6,369,909 B1 * | 4/2002 | Shima | ....................... | 358/1.15 |
| 6,373,585 B1 * | 4/2002 | Mastie et al. | .............. | 358/1.15 |
| 6,785,727 B1 * | 8/2004 | Yamazaki | ................... | 358/1.13 |
| 6,879,409 B2 * | 4/2005 | Motamed et al. | ........... | 358/1.13 |
| 7,167,260 B2 * | 1/2007 | Iwata et al. | ................ | 358/1.15 |
| 7,173,718 B2 * | 2/2007 | Iwata et al. | ................ | 358/1.13 |
| 7,382,484 B2 * | 6/2008 | Matsukubo et al. | ......... | 358/1.15 |
| 2002/0067508 A1 * | 6/2002 | Nishikawa et al. | ......... | 358/1.18 |
| 2002/0071134 A1 * | 6/2002 | Jackson et al. | ............. | 358/1.13 |
| 2002/0124756 A1 * | 9/2002 | Rai et al. | .................... | 101/484 |
| 2002/0163666 A1 * | 11/2002 | Iwata et al. | ................ | 358/1.15 |
| 2003/0007818 A1 * | 1/2003 | Kato | ........................... | 400/61 |
| 2003/0120791 A1 | 6/2003 | Weber et al. | | |
| 2004/0061892 A1 * | 4/2004 | Ferlitsch | .................... | 358/1.15 |
| 2004/0181661 A1 * | 9/2004 | Ferlitsch et al. | ............. | 713/153 |
| 2004/0184105 A1 * | 9/2004 | Ferlitsch | .................... | 358/2.1 |
| 2004/0184106 A1 * | 9/2004 | Ferlitsch | .................... | 358/2.1 |
| 2004/0190064 A1 * | 9/2004 | Ferlitsch et al. | ............. | 358/1.18 |

(Continued)

OTHER PUBLICATIONS

Ganguly, Sumit; Garofalakis, Minos; Rastogi, Rajeev; Processing Set Expressions Over Continuous Update Streams; SIGMOD 2003, pp. 265-276, 2003.

(Continued)

*Primary Examiner*—Kimberly A Williams
(74) *Attorney, Agent, or Firm*—Duft Bornsen & Fishman LLP

(57) ABSTRACT

Methods, systems, and software products are disclosed for transforming print jobs. A transform system of the invention includes a segmenting system and a plurality of compute systems. The segmenting system receives a print job comprising logical pages in a first encoding, and segments the print job of logical pages into work units. A plurality (some or all) of the work units each includes multiple logical pages. The segmenting system then transmits the work units to the compute systems. Responsive to receiving a work unit, a compute system converts the logical pages in the work unit to a second encoding thus performing the transform.

19 Claims, 5 Drawing Sheets

U.S. PATENT DOCUMENTS

2005/0024672 A1* 2/2005 Guster et al. .............. 358/1.14
2005/0099649 A1* 5/2005 Ferlitsch et al. ........... 358/1.15
2006/0031585 A1* 2/2006 Nielsen et al. ............. 709/246
2006/0250638 A1* 11/2006 Wang et al. ............... 358/1.15
2008/0259399 A1* 10/2008 Wada ....................... 358/1.15

OTHER PUBLICATIONS

Zhu, Hong; Hall, Patrick; May, John; Software Unit Test Coverage and Adequacy; ACM Computing Surveys, vol. 29, No. 4, Dec. 1997.
Graefe, Goetz; Query Evaluation Techniques for Large Databases, ACM Computing Surveys, vol. 25, No. 2, Jun. 1993.

* cited by examiner

METHODS AND SYSTEMS FOR SEGMENTING LOGICAL PAGES INTO WORK UNITS FOR PROCESSING ON MULTIPLE COMPUTE SYSTEMS

BACKGROUND OF THE INVENTION

1. Field of the Invention

The invention relates to the field of printing systems and, in particular, to transform processes that segment print jobs into work units having multiple logical pages.

2. Statement of the Problem

Printing systems associated with data processing enterprises generally include a localized print controller within the printing system. The print controller controls overall operation of the printing system including, for example, host interfacing, page description language interpretation, rasterizing, and lower level process control or interface features of the print engine associated with the printing system. Host interaction may include appropriate adapters for coupling the printing system to host systems utilizing one or more communication media and one or more communication protocols. Raw print jobs are received by the printing system from the attached host systems. The raw print jobs are generally encoded in the form of a page description language, such as PostScript, Hewlett-Packard PCL, Intelligent Printer Data Stream (IPDS), etc. In addition, raw print jobs may be encoded as simple character streams (ASCII) with no page description formatting associated therewith.

In whatever form the raw print job may be encoded or formatted, the print controller within the printing system interprets the received information to generate rasterized images of pages represented by the raw print job. Each rasterized page image generally comprises a 2-dimensional array of picture elements ("pixels") that represent a corresponding formatted page of the raw print job. Each pixel may represent an encoded color value in accordance with the requirements of the particular raw print job encoding and the capabilities of the printing system on which the print job is to be printed. The process of interpreting the raw print job to generate corresponding rasterized page images is typically referred to as "ripping" and the sequences of rasterized pages may be referred to as a "ripped print job" or "rasterized print job".

The print controller may then apply the ripped print job to a print engine (sometimes also referred to as an "imaging engine" or as a "marking engine"). The print engine then interacts with the imaging process to mark the printable medium (e.g., the sheet of paper) with the ripped pages provided by the print controller. For example, where the print engine is an electrophotographic imaging engine (e.g., a laser print engine), a laser or other optical imaging system transfers each ripped page through photosensitive materials to corresponding pixels on paper formed as particles of toner electrostatically transferred to the paper.

Because printing systems often receive print jobs in different encodings or protocols, such as PCL, PostScript, PDF, TIFF, JPEG, etc, it may be desirable to transform received print jobs to a common encoding used by the printing system. Transform processes convert incoming print jobs from one encoding to another encoding, possibly a proprietary encoding used in the printing system. The transform process tends to be compute-intensive and is thus often implemented using a parallel processing scheme. To allow for parallel processing of the print job, a typical transform process segments a received print job into work units that can be individually processed.

FIG. 1 illustrates a segmented print job in the prior art. A prior art segmenting process 104 receives a print job 102. Print job 102 includes a plurality of logical pages (PG) 1-X. Segmenting process 104 segments print job 102 into a plurality of work units 111-114. A work unit comprises a portion of data of a print job segmented for parallel processing. Each work unit 111-114 segmented by present segmenting processes 104 includes one logical page 1-X. For instance, work unit 111 includes logical page 1, work unit 112 includes logical page 2, etc.

Each work unit 111-114 will generally have some amount of overhead associated with processing the work unit, such as allocating resources to process the work unit, configuring the resources, scheduling, monitoring, etc. The overhead does not depend, or depends very little, on the contents of the work unit. In addition, once the work unit 111-114 has been scheduled, dispatched, and received by the process that will transform it, there may also be startup overhead. The amount of overhead processing is a problem in present transform systems.

SUMMARY OF THE SOLUTION

The present invention solves the above and other related problems by including multiple logical pages in an individual work unit. By including multiple logical pages of a print job in a work unit, the print job is segmented into fewer work units, and some of the processing overhead associated with a work unit can be shared to process multiple logical pages instead of merely a single logical page. Processing time may advantageously be reduced due to the reduced processing overhead.

One embodiment of the invention comprises a transform system comprising a segmenting system and a plurality of compute systems. The transform system may be implemented as a stand-alone system or may be implemented in a print controller of a printing system. When in operation, the segmenting system receives a print job comprising logical pages in a first encoding. The segmenting system segments the print job of logical pages into work units. A plurality of the work units each includes multiple logical pages. The segmenting system may segment the print job according to many desired segmenting algorithms, with the idea being that some or all of the work units include multiple logical pages. After segmenting the print job, the segmenting system transmits the work units to the compute systems for parallel processing of the work units. Responsive to receiving a work unit, a compute system converts the logical pages in the work unit to a second encoding thus performing the transform.

The transform system advantageously groups multiple logical pages into some or all of the work units. Processing time for transforming the print job is thus reduced by reducing the average overhead per logical page transformed.

The invention may include other exemplary embodiments described below.

DESCRIPTION OF THE DRAWINGS

The same reference number represents the same element on all drawings.

DETAILED DESCRILPTION OF THE INVENTION

FIGS. 2-5 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
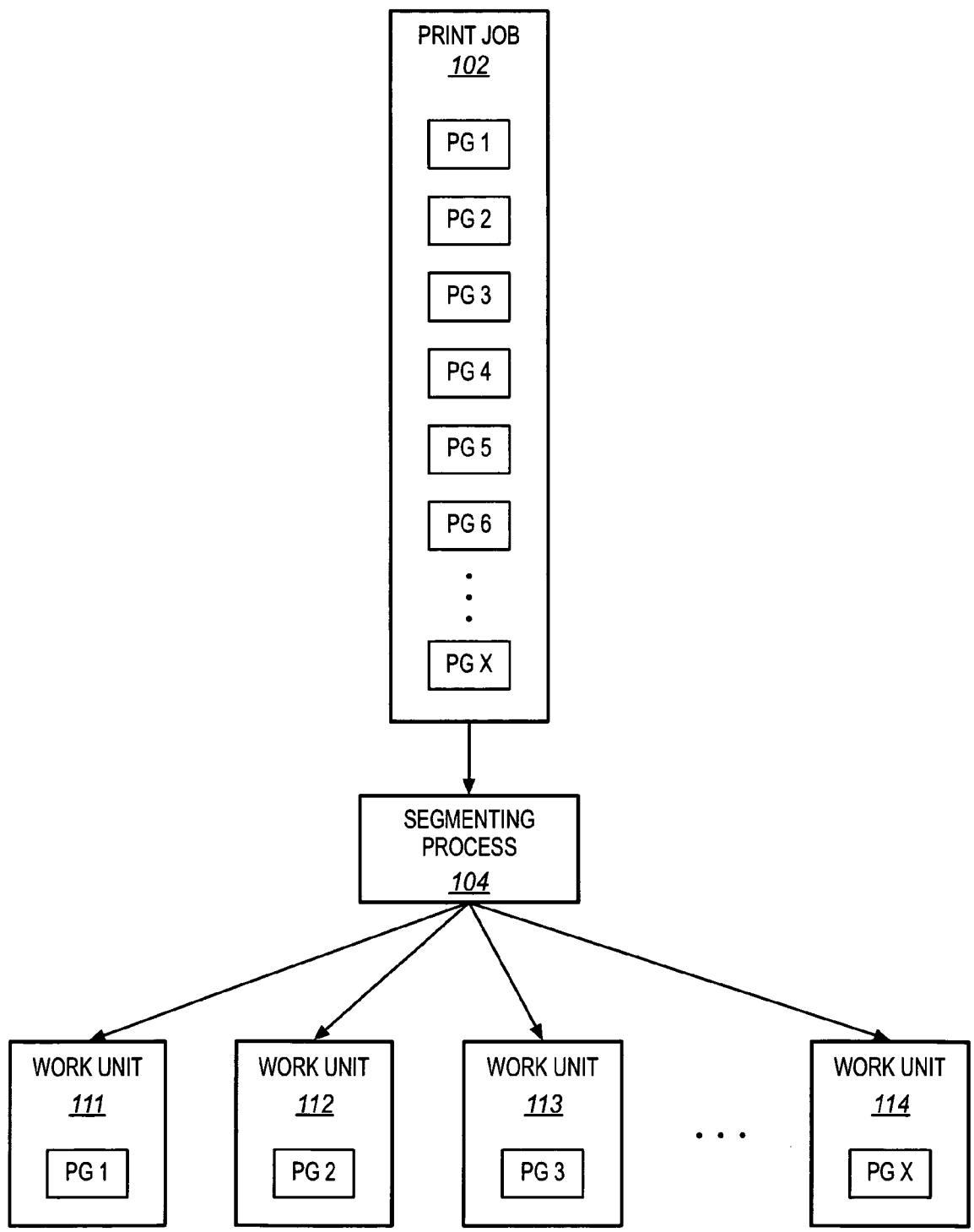
FIG. 1 illustrates a segmented print job in the prior art.
Figure 2:
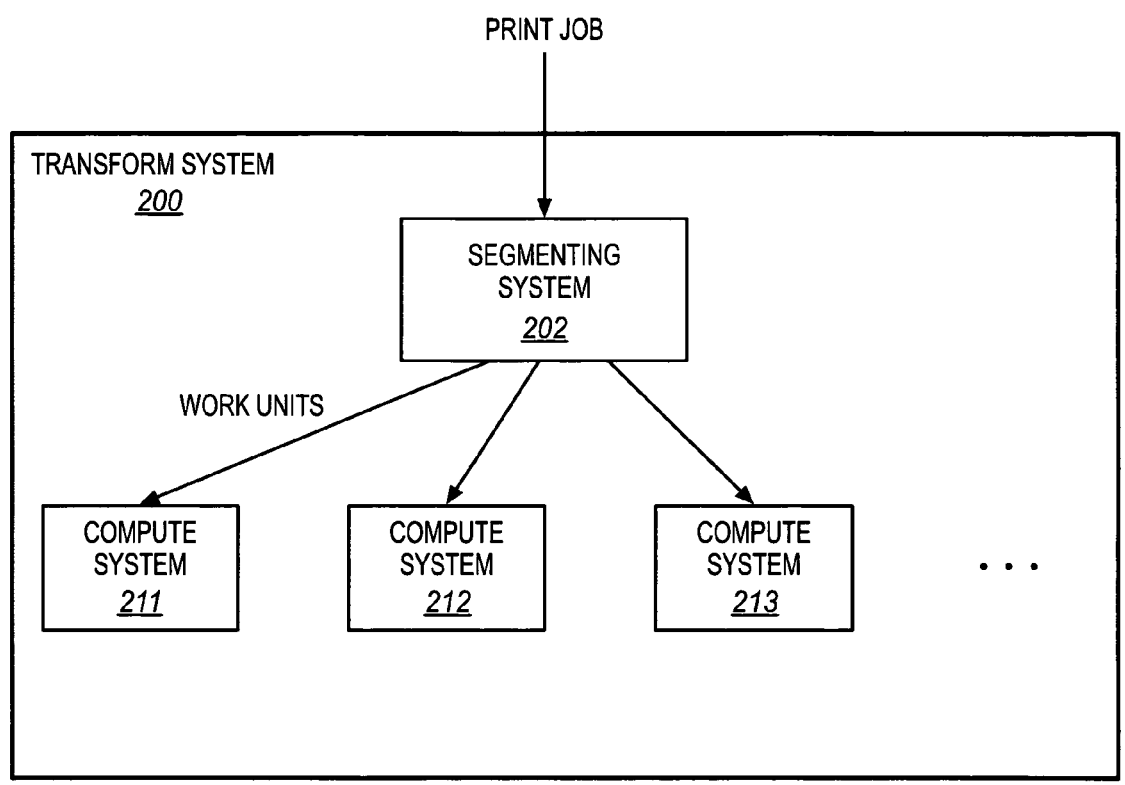
FIG. 2 illustrates a transform system in an exemplary embodiment of the invention.

FIG. 2 illustrates a transform system 200 in an exemplary embodiment of the invention. Transform system 200 is operated in association with a printing system (not shown), such as a continuous forms printer or a cut-sheet printer. Transform system 200 comprises any system that converts print jobs for a printing system from one encoding or protocol to another encoding or protocol. Transform system 200 may be implemented in hardware, software, or a combination of hardware and software. Transform system 200 may be implemented in a stand-alone device or server, may be implemented in a print controller of a printing system, or may be implemented in another system coupled to the printing system.

Transform system 200 includes a segmenting system 202 and a plurality of compute systems 211-213. Compute systems 211-213 are configured to provide parallel processing of data (work units) provided by segmenting system 202. Segmenting system 202 and compute systems 211-213 may be implemented on the same platform or different platforms. Each compute system 211-213 may comprise one or more processes located on a dedicated platform or sharing a platform with other compute systems. Although three compute systems 211-213 are shown, transform system 200 may include more or less compute systems to perform parallel processing. Transform system 200 may include other components not shown for the sake of brevity.

In operation, segmenting system 202 receives a print job comprising logical pages in a first encoding. A logical page may comprise an actual page, a sheetside comprising one or more actual pages, etc. The first encoding of the logical pages may be PCL, PostScript, PDF, TIFF, JPEG, or another encoding. Responsive to receiving the print job, segmenting system 202 segments the print job of logical pages into work units. A plurality of the work units each includes multiple logical pages. It is not a requirement that each of the work units includes multiple pages. However, reduction of processing time is furthered when all or substantially all of the work units include multiple logical pages.

Figure 3:
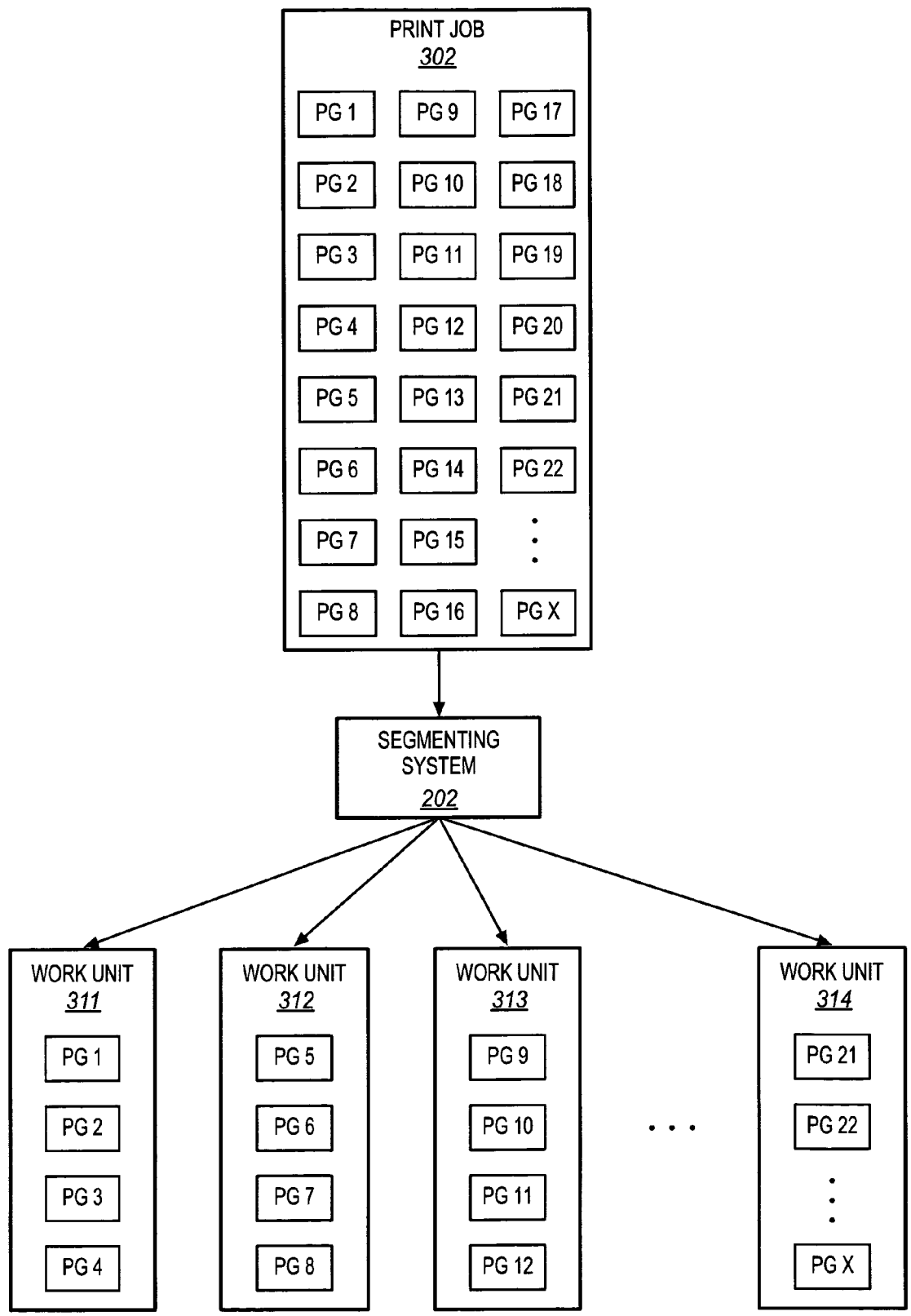
FIG. 3 illustrates a segmented print job in an exemplary embodiment of the invention.

FIG. 3 illustrates a segmented print job in an exemplary embodiment of the invention. Segmenting system 202 receives print job 302. Print job 302 includes a plurality of logical pages (PG) 1-X. Segmenting system 202 segments print job 302 into a plurality of work units 311-314. Work units 311-314 segmented by segmenting system 202 each include multiple logical pages (although it is not a requirement that each work unit includes multiple logical pages, nor is it a requirement that each work unit include the same number of pages). For instance, work unit 311 includes logical pages 1-4, work unit 312 includes logical pages 5-8, etc. The number of logical pages in each work unit 311-314 is just an example. Work units 311-314 may include more or less logical pages as desired.

Segmenting system 202 may segment print job 302 according to many desired segmenting algorithms. Segmenting system 202 may include the same number of logical pages in each or substantially each work unit 311-314, or may include different numbers of logical pages in work units 311-314. Segmenting system 202 may include consecutive logical pages in work units 311-314, or may include non-consecutive logical pages. Segmenting system 202 may determine a number of logical pages to include in a work unit, and use that number for some or all of work units 311-314. Segmenting system 202 may alternatively determine a number of logical pages to include in a work unit, and then change the number based on operating parameters associated with transforming a print job. Operating parameters comprise any data associated with a print job, such as print job size, system congestion, priority, processing time, etc. Some possible segmenting algorithms are described below.

After segmenting a print job, segmenting system 202 transmits the work units to compute systems 211-213 for parallel processing of the work units (see FIG. 2). Segmenting system 202 may distribute the work units to compute systems 211-213 according to a desired parallel processing algorithm.

Compute systems 211-213 receive the work units from segmenting system 202. Responsive to receiving a work unit, a compute system 211-213 converts the logical pages in the work unit to a second encoding. When converted to the second encoding, the print job is transformed. If transform system 200 is implemented as a stand-alone system, then the second encoding may be a proprietary encoding or any other encoding desired for the destination printing system of the print job. If transform system 200 is implemented in a print controller, then the second encoding may comprise a rasterized image.

If transform system 200 is implemented as a stand-alone system, then transform system 200 may further include a combining system or process (not shown) that receives the processed work units from compute systems 211-213. The combining system reassembles the processed work units of the print job for presentation to the printing system. Work units may finish out of order, so the combining system assembles the processed work units in the proper sequence.

If transform system 200 is implemented in a print controller, then transform system 200 may not reassemble the work units. Transform system 200 may include a print head interface (not shown) that transmits the processed work units directly to one or more print heads of the printing system.

Figure 4:
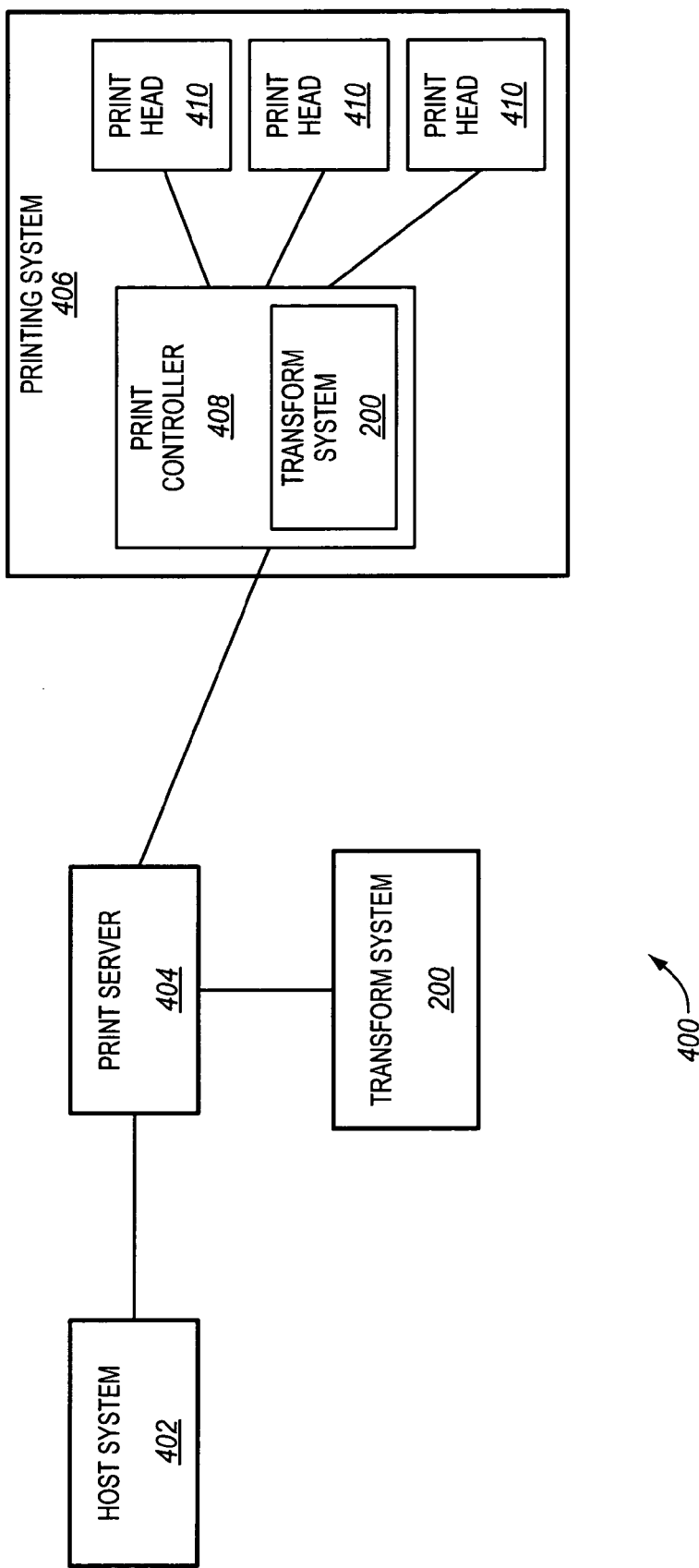
FIG. 4 illustrates a print network in an exemplary embodiment of the invention.

FIG. 4 illustrates a print network 400 in an exemplary embodiment of the invention. Print network 400 includes a host system 402, a print server 404, a stand alone transform system 200, and a printing system 406. Printing system 406 includes a print controller 408 and a plurality of print heads 410. Although three print heads 410 are shown, printing system 406 may have one print head (monochrome simplex), two print heads (monochrome duplex), eight print heads (CMYK duplex), or more print heads (extra colors, gloss). Print controller 408 includes a transform system 200. Print network 400 may include other devices or systems not shown for the sake of brevity.

Transform system 200 is illustrated both as a stand-alone system and as integrated in print controller 408. Transform system 200 may be implemented in either way depending on the needs and desires of the customer.

When in operation, host system 402 transmits one or more print jobs to print server 404. Other host systems not shown may also transmit print jobs to print server 404. Print server 404 includes a management process (not shown) that determines where to transmit the print jobs. For instance, print server 404 may determine to transmit a particular print job to stand-alone transform system 200, such as if the print job is large and compute-intensive.

If either of the transform systems 200 shown in FIG. 4 receives print jobs, they operate as described above in FIG. 2 to segment the print jobs into work units. One or more of the work units includes a plurality of logical pages. Referring again to FIG. 2, segmenting system 202 of transform system 200 (see FIG. 2) may segment a print job according to many desired segmenting algorithms. The following provide exemplary algorithms, although other desired algorithms may be used.

In one algorithm, segmenting system 202 may determine a number N where each work unit includes N logical pages of a print job. N may be 20, 50, 100, etc, as desired. Segmenting system 202 may determine N based on control information provided by host system 402, provided by an administrator (not shown), or provided by another system or person. For instance, the control information may be set by a configuration parameter at start time, may be set by the administrator, or may be set on a per-job basis. If the print job has less than N logical pages, it is processed as a single work unit.

In another algorithm, segmenting system 202 may determine a number N of logical pages in a work unit based on operating parameters associated with transforming a print job. The number N of logical pages as determined by segmenting system 202 does not have to be the same for each work unit. The following describes examples of determining N based on operating parameters.

In one example, segmenting system 202 may determine N based on the size of the print job and/or the number of compute systems 211-213 available to process the print job. Assume that the print job includes L logical pages and that segmenting system 202 determines that there are K compute systems 211-213 available to process the print job. Segmenting system 202 may then calculate the number M of work units for the print job based on the K available compute systems 211-213. As an example, M=4K will generally give fine enough granularity to keep compute systems 211-213 busy. Segmenting system 202 may then calculate the number N of logical pages in a work unit, where N=L/M.

In another example, segmenting system 202 may determine N based on the number of other print jobs being processed by transform system 200. If transform system 200 is congested (i.e., multiple jobs are present) and the completion time for a particular print job is not as important, then segmenting system 202 may default to a larger number N of logical pages per work unit to minimize overhead. If there is only a single print job in transform system 200, then segmenting system 202 may include a smaller number N of logical pages per work unit to keep compute systems 211-213 busy. Segmenting system 202 may dynamically change N as the processing load changes. For example, a print job may start at 100 logical pages per work unit if there are other print jobs in transform system 200. If the load in transform system 200 decreases, segmenting system 202 may change to fewer logical pages per work unit as compute systems 211-213 become available.

In another example, segmenting system 202 may determine N based on the processing time of the print job. If processing of work units for a print job take a long time and there is a requirement for the print job to be completed as quickly as possible, segmenting system 202 may determine a larger N for the work units representing the beginning of the print job. Segmenting system 202 may also determine a smaller N for the work units representing the end of the print job. By making the number N of logical pages per work unit smaller towards the end of the print job, the work units get finished as close to each other as possible. The goal is to have as many work units at the end as there are compute systems 211-213 available so that they all finish at the same time.

The above and other algorithms may be implemented in either the stand-alone transform system 200 or the transform system 200 in print controller 408 of FIG. 4. The transform system 200 in print controller 408 may have additional algorithms that are based on constraints of printing system 406.

In the transform system 200 in print controller 408, each compute system 211-213 will most likely be sending the output work units directly to print heads 410. For a high speed/high resolution printing system 406, there may be output bandwidth constraints such that each compute system 211-213 can feed only a limited number of print heads 410 at the same time, possibly just one. Thus, segmenting system 202 may determine N based an output bandwidth of compute systems 211-213 to print heads 410.

As an example, if the front and back print engines are sufficiently far apart or output bandwidth is not a problem, then an even number of logical pages (e.g., sheetsides) can be concatenated and sent to a single print head 410. In many cases, print jobs may have different characteristics on the front and back side, and assigning front and back logical pages to the same work unit helps handle the different characteristics. If the output bandwidth of compute systems 211-213 is not sufficient to cover output to all the print heads 410 (which is a possible case if the head assignment is not taken into account), then each logical page has a "communication window" where it will need to have access to the output bandwidth. The logical pages are aggregated (segmented) in such a way that the communication windows do not interfere with one another. Depending on the available output bandwidth, this may require that the windows for the aggregated logical pages are disjoint. If the output bandwidth supports simultaneous output to P print heads 410, then no more than P print heads 410 can be required by the overlapping communication windows. Given these constraints, the logical pages can be aggregated so that the communication windows do not interfere.

One possible strategy is to have a fixed stride M. If a first logical page (1LP) is assigned to a compute system 211-213, then the first logical page is aggregated with 1LP+M, 1LP+2M, and so on. Front/back assignment can also be brought into play, so that 1LPf, 1LPb, 1LPf+M, 1LPb+M, 1LPf+2M, 1LPb+2M, and so on are aggregated.

Another possibility is to formulate an assignment problem, taking into account bandwidth constraints and solve it for the optimal logical page to work unit assignment. Such an assignment problem would be a variant of a two-dimensional assignment problem. These problems can be solved quickly, so a new problem could be formulated and solved every time a work unit finishes processing. The problem formulation can take into account the work units done on each compute system and waiting for transfer to print heads, in addition to other constraints.

Figure 5:
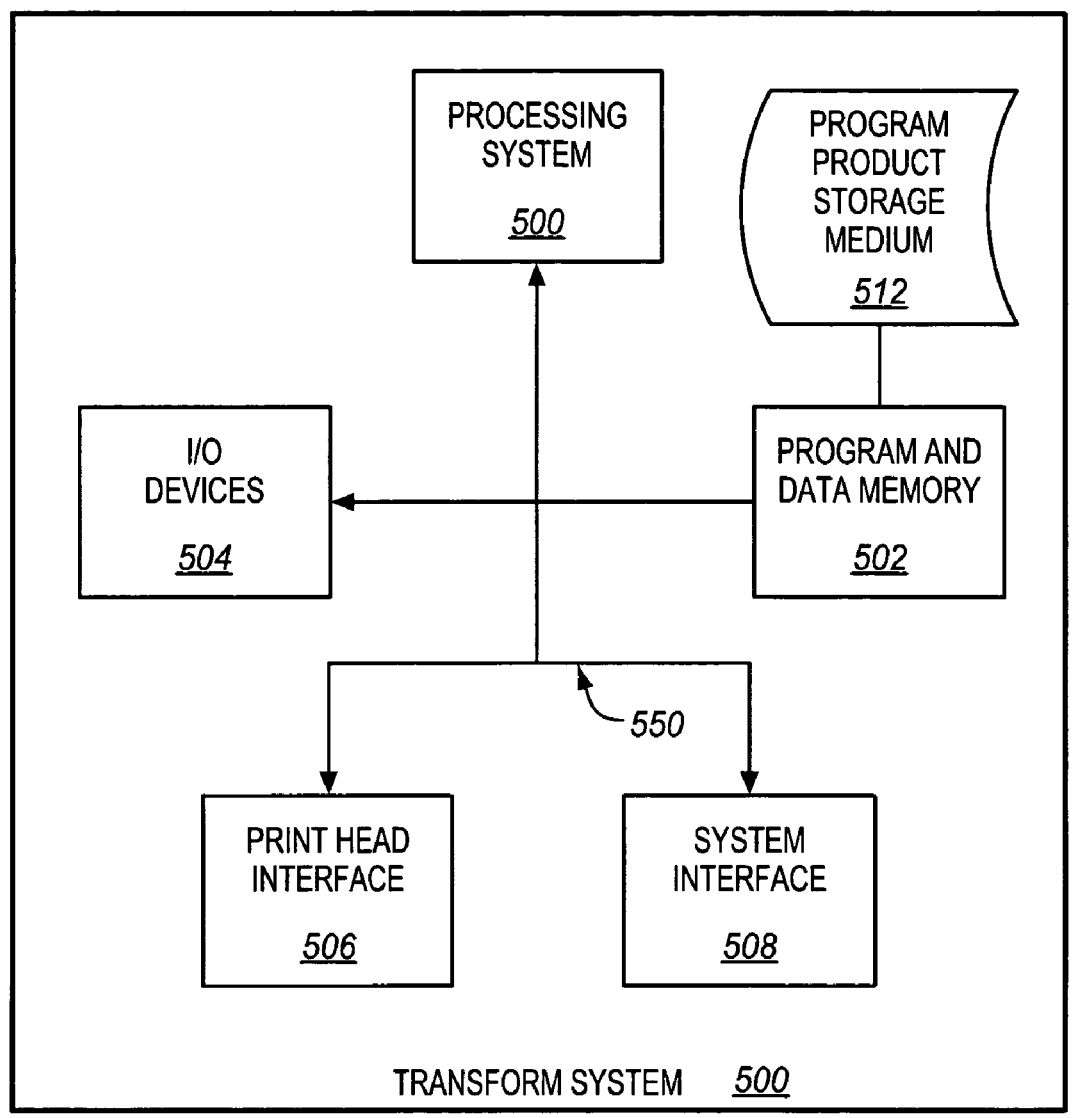
FIG. 5 illustrates a transform system as including a data processing device in an exemplary embodiment of the invention.

Embodiments of the invention can take the form of an entirely hardware embodiment, an entirely software embodiment, or an embodiment containing both hardware and software elements. In a preferred embodiment, the invention is implemented in software, which includes but is not limited to firmware, resident software, microcode, etc. FIG. 5 illustrates a transform system 500 as including a data processing device adapted to provide features and aspects hereof by executing programmed instructions and accessing data stored on a computer-readable storage medium.

Furthermore, the invention can take the form of a computer program product accessible from a computer-usable or computer-readable medium 512 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processing system 500 coupled directly or indirectly to memory elements 502 through a system bus 550. The memory elements can include local memory employed during actual execution of the program code, bulk storage, and cache memories which provide temporary storage of at least some program code in order to reduce the number of times code must be retrieved from bulk storage during execution.

Input/output or I/O devices 504 (including but not limited to keyboards, displays, pointing devices, etc) can be coupled to the system either directly or through intervening I/O controllers. One particular I/O device used in a transform system of a print controller is a print head interface 506.

Network adapters or other system interfaces 508 may also be coupled to the system to enable the data processing system to become coupled to other data processing systems or storage devices through intervening private or public networks. Modems, cable modems, IBM Channel attachments, SCSI, Fibre Channel, and Ethernet cards are just a few of the currently available types of network or host interface adapters.

Although specific embodiments were described herein, the scope of the invention is not limited to those specific embodiments. The scope of the invention is defined by the following claims and any equivalents thereof.

We claim:

1. A printer adapted to transform print jobs, the printer comprising:
   print heads; and
   a print controller comprising a transform system, the transform system comprising:
      a segmenting system adapted to receive a print job from a host system, wherein the print job comprises a plurality of logical pages in a first encoding, and further adapted to segment the print job into work units, wherein each work unit comprises a subset of the plurality of logical pages of the print job, and wherein at least one of the work units includes a plurality of logical pages; and
      a plurality of compute systems adapted to process the work units in parallel, wherein each compute system is further adapted to receive one or more of the work units from the segmenting system, and further adapted to convert the logical pages of the one or more of the work units from the first encoding to a second encoding.

2. The printer of claim 1 wherein the segmenting system is further adapted to determine the number of logical pages in a work unit based on control information indicating the number of logical pages.

3. The printer of claim 1 wherein the segmenting system is further adapted to determine the number of logical pages in a work unit based on operating parameters associated with transforming the print job.

4. The printer of claim 1 wherein the segmenting system is further adapted to determine the number of logical pages in a work unit based on at least one of the size of the print job and the number of compute systems available to process the print job.

5. The printer of claim 1 wherein the segmenting system is further adapted to determine the number of logical pages in a work unit based on a number of other print jobs being processed by the transform system.

6. The printer of claim 5 wherein the segmenting system is further adapted to change the number of logical pages in a work unit based on a change in the number of other print jobs being processed by the transform system.

7. The printer of claim 1 wherein the segmenting system is further adapted to determine the number of logical pages in a work unit based on the processing time of the print job.

8. The printer of claim 7 wherein the segmenting system is further adapted to determine a larger number of logical pages in a work unit representing the beginning of the print job, and determine a smaller number of logical pages in a work unit representing the end of the print job so that the number of logical pages in a work unit becomes smaller toward the end of the print job.

9. The printer of claim 1 wherein the segmenting system is further adapted to determine the number of logical pages in a work unit based on an output bandwidth of the compute systems to the print heads of the printer.

10. A method of operating a transform system of a printer to transform print jobs for the printer, the method comprising:
    receiving a print job comprising a plurality of logical pages in a first encoding from a host system;
    segmenting the print job into work units, wherein each work unit comprises a subset of the plurality of logical pages of the print job, and wherein at least one of the work units includes a plurality of logical pages; and
    converting the logical pages in the work units to a second encoding with a plurality of compute systems adapted to process the work units in parallel.

11. The method of claim 10 further comprising:
    determining the number of logical pages in a work unit based on control information indicating the number of logical pages.

12. The method of claim 10 further comprising:
    determining the number of logical pages in a work unit based on operating parameters associated with transforming the print job.

13. The method of claim 12 further comprising:
    changing the number of logical pages in a work unit during processing of the print job.

14. The method of claim 12 wherein the operating parameters include at least one of the size of the print job, the number of compute systems available to process the print job, the number of other print jobs being processed by the transform system, or the processing time of the print job.

15. A transform system of a printer adapted to transform print jobs for the printer, the transform system comprising:
    a processing system;
    a computer memory;

a segmenting system adapted to receive a print job from a print server, wherein the print job comprises a plurality of logical pages in a first encoding, and further adapted to segment the print job into work units, wherein each work unit comprises a subset of the plurality of logical pages of the print job, and wherein at least one of the work units includes a plurality of logical pages; and a plurality of compute systems adapted to process the work units in parallel, wherein each compute system is further adapted to receive one or more of the work units from the segmenting system, and further adapted to convert the logical pages of the one or more of the work units from the first encoding to a second encoding;

wherein the converted logical pages of the print job in the second encoding are sent to the printer.

16. The transform system of claim 15, further comprising:

a combining system adapted to receive the converted logical pages in the second encoding from the plurality of compute systems and reassemble the logical pages in a proper sequence before sending the logical pages to the printer.

17. The transform system of claim 15 wherein the segmenting system is further adapted to determine the number of logical pages in a work unit based on a number of other print jobs being processed by the transform system.

18. The transform system of claim 15 wherein the segmenting system is further adapted to determine a larger number of logical pages in a work unit representing the beginning of the print job, and determine a smaller number of logical pages in a work unit representing the end of the print job so that the number of logical pages in a work unit becomes smaller toward the end of the print job.

19. The transform system of claim 15 wherein the segmenting system is further adapted to determine the number of logical pages in a work unit based on an output bandwidth of the compute systems to print heads of the printer.

* * * * *